March 30, 1937.    H. O. LETZERICH    2,075,528
BEAM COMPASS CARRIAGE
Filed May 1, 1936

INVENTOR
Harry O. Letzerich
BY *Harry O. Letzerich*

Patented Mar. 30, 1937

2,075,528

UNITED STATES PATENT OFFICE 2,075,528

BEAM COMPASS CARRIAGE

Harry O. Letzerich, Philadelphia, Pa.

Application May 1, 1936, Serial No. 77,414

6 Claims. (Cl. 33—27)

This invention is an improvement in the carriage of a beam compass used in all classes of draftsmanship for describing circles of a larger radius than can conveniently be drawn by the usual smaller instruments and the improvement is intended to facilitate the accuracy of the drawing.

There are two general divisions into which these instruments may be divided, one of considerable refinement and cost and which is fitted with some sort of vernier or adjustment to permit the greatest accuracy and the other type, whereby a rougher and much cheaper instrument may be used but which permits fairly accurate work to be done.

The object of this invention is to further refine the last named type so that a greater measure of accuracy can be obtained at the lower cost of the simpler and cheaper beam compass.

Other objects and advantages will be more apparent to those skilled in the art from the following description of the accompanying drawing in which.

Figure 1:
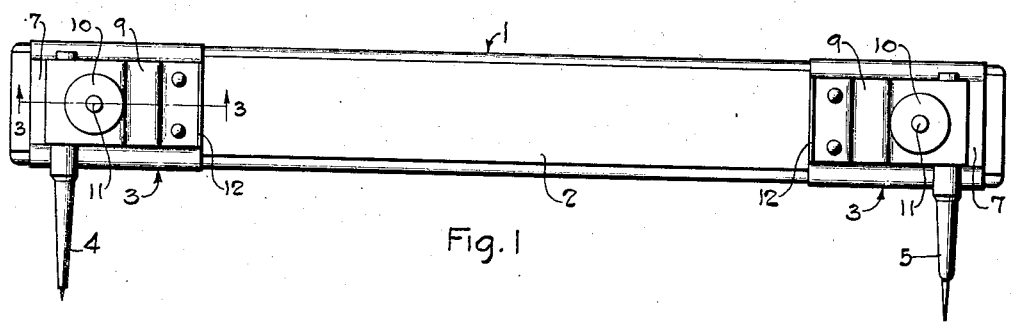
Fig. 1 is a side elevation showing the entire beam compass assembled ready for use.
Figure 2:
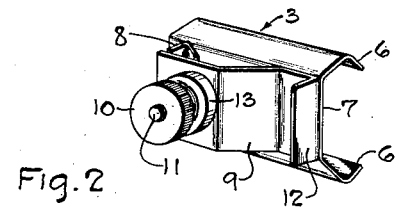
Fig. 2 is a perspective view of my improved carriage.

The assembled beam compass is shown generally at 1, Fig. 1, the beam 2 being of any convenient length and preferably of wood, although any other suitable material may be used. Carriages 3—3, located at either end of the beam, are identical, and hence the description of one will suffice for both. The carriage is made of relatively thin sheet metal having the property of springing or of being slightly resilient, this in order that carriage bed plate wings 6—6 at each side of the bed plate 7 may grip or clamp the beam 2 with sufficient pressure to prevent longitudinal movement thereon while drawing a circle or arc and yet be adapted to yield to effect longitudinal adjustment in order to change the distance between the center point and the pen (or pencil points) 4 and 5 when a different radius is desired. The wings are substantially of concave shape partially enclosing the beam.

So far this describes the carriage as extensively used heretofore. As the design of the center point and pen and pencil points is old, they form no part of this invention and hence need not be further mentioned.

The above mentioned points are held in V-holders 8 attached to the bed plate 7 preferably by welding or brazing and are clamped tightly by springs 9 riveted or brazed to bed plate 7, this spring being clamped against the points 4 and 5 by a knurled nut 10 threaded on a screw 11, this nut being attached to the bed plate 6 preferably by thread and brazed or soldered to prevent rotation. By attaching the V-holders directly to the bed plate, I am able to accomplish many of the desirable results herein set forth such as nicety of adjustment with minimum possibility of misalignment of the pen or pencil and with minimum effort.

The spring 9 has an upturned lip or "thumb" lug 12 at the end of the bed plate 7, this feature being one of the improved aspects of the invention as it is intended to provide an enlarged surface against which the thumb can exert the slight pressure required when shifting the carriage to a new radius. Heretofore it has been necessary to apply such pressure to the relatively sharp edges of the bed plate 7, the spring 9 in most cases not extending to the said edge of plate 7 with the result that the delicacy of pressure required for a minute adjustment could not always be obtained. Hence several movements to and fro might be made before the final setting was obtained.

Another improvement is the improved manner of attaching the V-holders 8 to the bed plate 7 instead of to the spring 9 as heretofore. This new mode of application stiffens the bed plate 7 at the opposite end from that to which an extended lip 12 of the spring 9 is attached, thus permitting the wings 6—6 to function to the best advantage and irrespective of any bending or slight springing of the bed plate 7. The result is that movement of the carriage by pressure of the thumb on lip 12 will be resisted by a very even and regular pressure of the wings 6—6 on the beam 2.

Figure 3:
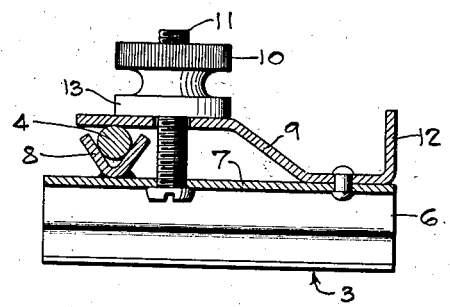
Fig. 3 is a longitudinal section through one of the carriages taken on the line 3—3 of Fig. 1.
Figure 4:
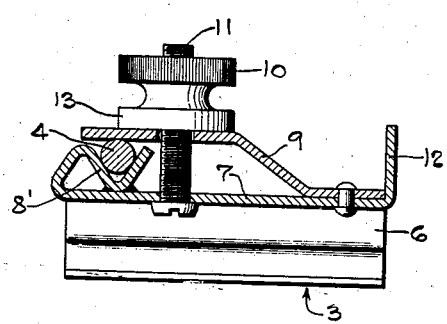
Fig. 4 is a modification of the carriage, the section being taken on a line similar to line 3—3 of Fig. 1.

Still another feature is an improved relation of a bearing flange 13 on the clamping nut 10, which flange overlies the center of points 4 and 5 so as to insure that the thrust of the nut and screw is positively applied to the points 4 and 5 through spring 9 held within the V-holders 8. This further makes for rigidity in case it is desired to adjust the setting of the beam without removing the center point from the drafting board. Fig. 4 shows a modification in which the "thumb" lug 12 is formed integrally with bed plate 7. Also, the V-holder is formed from a reversely bent extension 8' of the bed plate. The construction and function of lug 12 and the V-holder 8 are the same as that shown in Fig. 3. It is understood that any usual means of attaching the various parts together such as riveting, brazing, soldering, welding or by threaded connections may be used as well as the usual modifications covered by the intent and spirit of the invention as defined by the claims appended hereto or as substantially shown in the drawing and specification hereof.

I claim:

1. A beam compass pointer carriage comprising, in combination, a flat bed plate with substantially concave integral wings at each side thereof for engaging the beam, and a V-shaped pointer holder attached to and supported directly by said bed plate.

2. The combination set forth in claim 1 further characterized in that the V-shaped holder is secured near one end of the bed plate and a clamping spring overlying the V-holder is attached to the opposite end of the bed plate.

3. The combination set forth in claim 1 further characterized in that the V-shaped holder is secured near one end of the bed plate and a clamping spring overlying the V-holder is attached to the opposite end of the bed plate, the end of the clamping spring which is attached to the bed plate, having a bent extension forming a lip extending outwardly at approximately 90° to the bed plate.

4. The combination set forth in claim 1 further characterized in that the V-shaped holder is secured near one end of the bed plate and a clamping spring overlying the V-holder is attached to the opposite end of the bed plate, the end of the clamping spring which is attached to the bed plate having a bent extension forming a lip extending outwardly at approximately 90° to the bed plate, a bolt secured in the bed plate and extending through the clamping spring, and a clamping nut on said bolt having a bearing flange resting on the clamping spring to tighten a pen or pencil in the V-holder.

5. The combination set forth in claim 1 further characterized in that said V-holder is formed from a reversely bent extension of one end of the bed plate, a clamping spring extending over the V-holder and attached to the bed plate, and a bolt and nut for clamping said spring and V-holder together, said clamping nut having a bearing flange resting on said clamping spring.

6. The combination set forth in claim 1 further characterized in that the V-shaped holder is secured near one end of the bed plate and a clamping spring overlying the V-holder is attached to the opposite end of the bed plate, an upturned lip is formed on the end of the bed plate to which the clamping spring is fastened, from a reversely bent extension of the bed plate, a bolt secured in the bed plate and extending through the clamping spring, and a clamping nut on said bolt having a bearing flange resting on the clamping spring to tighten a pen or pencil in the V-holder.

HARRY O. LETZERICH.